Aug. 29, 1961   S. BIRT   2,998,031
CONVEYOR BELTS
Filed May 10, 1960
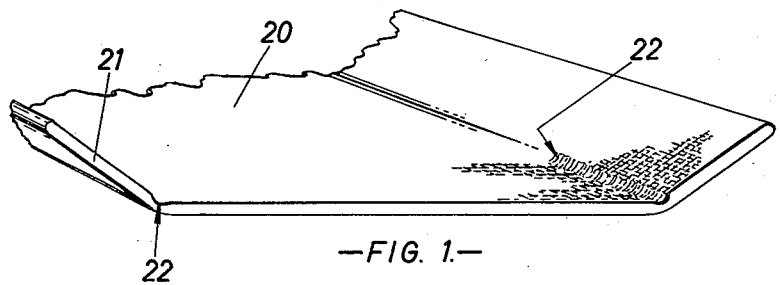
—FIG. 1.—
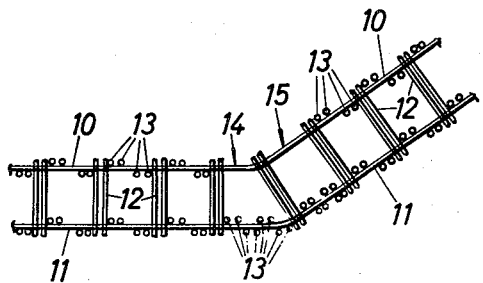
—FIG. 2.—
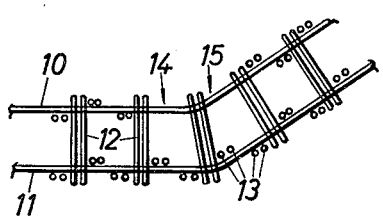
—FIG. 3.—
INVENTOR
STANLEY BIRT
BY
ATTORNEYS

United States Patent Office 2,998,031
Patented Aug. 29, 1961

2,998,031
CONVEYOR BELTS
Stanley Birt, Wallasey, England, assignor to Gandy Limited, Wallasey, England, a British company
Filed May 10, 1960, Ser. No. 28,093
Claims priority, application Great Britain May 22, 1959
3 Claims. (Cl. 139—410)

The invention is concerned with improvements in or relating to a conveyor belt.

It is desired in many cases to prevent spillage from the edges of a conveyor belt of goods carried thereon and accordingly separate edge pieces at the side of, and angularly disposed in relation to, the belt proper have been proposed for preventing this spillage. However, it is found in practice that with some goods, especially goods of small size, the lower surface of the edge pieces do not contact the belt sufficiently closely at all points and gaps appear through which the small goods will spill off the belt. Thus, for example, in the case of a belt used for the conveyance and inspection of peas, the small gaps permit spillage of the peas with consequent inconvenience. It has also been proposed to produce belts supported in trough form which largely prevents spillage but these are not always suitable particularly when inspection of goods carried by the belt is required, since there is a tendency for the goods to collect into a relatively deep mass in the centre of the trough.

It is an object of the invention to provide a conveyor belt designed to prevent spillage of goods carried thereon without any of the disadvantages outlined above.

According to the invention there is provided an integral conveyor belt comprising a woven textile material having at least one flexing or hinging line or zone extending longitudinally of the belt and spaced from one edge thereof, said flexing or hinging line or zone being formed by an adjustment of the weave so as to reduce the density of the yarns in said zone.

Preferably the conveyor belt has two flexing or hinging lines or zones which are arranged each spaced from a longitudinal edge so as to provide a main central portion with two hinging or flexing side portions.

The adjustment of the weave in accordance with the invention is preferably effected by omission of some warp ends from a zone of the fabric in relation to the number of warp ends used for an equivalent zone in the fabric as a whole. The actual spacing from the edge of the reduced density of warp ends will be dictated by the width of the side portions which are required for a particular belt.

A particularly suitable fabric for a conveyor belt in accordance with the invention is one made from a double cloth which is connected by binder threads, the omission of warp ends from the belt being effected in the cloth which is intended to serve as the upper or carrying surface of the conveyor belt. This provides in the finished belt two lines or zones spaced from the respective longitudinal edges of the belt, at which the density of the weave is reduced, thus facilitating the flexing of the side portion and in particular enabling them to be turned upwards at an oblique angle to the main central portion to provide, as it were, angularly disposed side panels as part of the integral belt.

It is also preferred when adjusting the weave of the fabric forming the conveyor belt in accordance with the invention not only to omit the warp ends at the respective zones required, but in addition to increase the number of warp ends in the lower cloth of the double fabric so that the increased density of the warp ends in the lower cloth tends to force the side portions to assume the upward oblique angular relation to the central portion.

Two embodiments of a conveyor belt in accordance with the invention will now be described by way of example with reference to the accompanying drawings, wherein:

FIGURE 1 is a perspective view of a portion of a conveyor belt in accordance with the invention with the side panels shown in flexed position.

FIGURE 2 is a diagrammatic illustration of a portion of a belt formed from a double cloth connected by binder threads, with warp ends omitted in one portion or zone of the upper cloth or carrying surface, and FIGURE 3 is a diagrammatic illustration of a portion of the belt similar to FIGURE 1, but with increased density of warp ends in the lower cloth.

Referring to FIGURE 2, the conveyor belt is formed from a double cloth comprising an upper cloth 10, a lower cloth 11 connected by binder threads 12. In the embodiment illustrated there are four warp ends 13 to each unit length of the cloth in both upper and lower parts, the warp ends 13 being omitted from two of said zones 14, 15 to provide the desired reduction in density, the warp ends 13 omitted from the upper cloth having been inserted in the equivalent zone in the lower cloth to provide eight warp ends per unit in relation to the remaining zones of the fabric. In the embodiment illustrated in FIGURE 3, no additional warp ends are used in zones 14 and 15 of the lower cloth.

To provide a belt with a 20" central portion and two side pieces of two inches width, the cloth being 1/8" thick, the belt is drawn in a two-ply loom with eight ends per dent together with two binder threads, there being a reed space of 7 dents per inch. At the 14th and 15th dent from either edge, the eight warp ends are omitted. The warp consists of 7/8's cotton with binder threads of 12/12's cabled yarn. The weft yarn is 12/6's cotton woven 8 picks on the face. This corresponds to the fabric shown in FIGURE 3. In the alternative construction illustrated in FIGURE 2, the eight warp ends omitted from the said 14th and 15th dents are incorporated in the lower part of the said dents, the binder threads being employed as before.

In either of the constructions referred to the binder threads can be omitted from the dents if desired.

When a belt formed in accordance with the invention and having central portion 20, side portions 21 and flexing line or zone 22 is carried over the usual supporting pulleys for the conveyor system, supporting brackets are provided at the side of the conveyor system to support the side panels 21 in the angular position. When the belt reaches the end of its run and passes round an end pulley or roller, the side panels 21 drop back into the same plane as the central portion 20.

If desired, one or both faces of belts in accordance with the invention may be provided with a washable protective coating.

I claim:

1. A conveyor belt of woven textile material having two flexing zones each extending longitudinally of the belt and respectively spaced from an edge thereof said belt being made from a multi-ply cloth connected by binder threads, the warp ends in a flexing zone of the upper cloth being reduced in number in relation to the warp ends in any other zone of the textile material of equal width.

2. A conveyor belt of woven textile material having two flexing zones each extending longitudinally of the belt and respectively spaced from an edge thereof, said belt being made from a double cloth connected by binder threads, the upper cloth serving as the carrying surface of the belt and having two zones in which the warp ends per dent are omitted to provide said flexing zone.

3. A conveyor belt in accordance with claim 2 wherein in addition in the two zones of the lower cloth corresponding to the zones of the upper cloth in which the warp ends are omitted the number of warp ends is increased.

References Cited in the file of this patent

UNITED STATES PATENTS

| | | |
|---|---|---|
| 1,511,753 | Chisholm | Oct. 14, 1924 |
| 2,164,925 | Kelso | July 4, 1939 |